United States Patent
Light-Holets et al.

(10) Patent No.: US 11,680,532 B2
(45) Date of Patent: Jun. 20, 2023

(54) CYCLICAL APPLICATIONS FOR INTERNAL COMBUSTION ENGINES WITH CYLINDER DEACTIVATION CONTROL

(71) Applicant: Cummins Inc., Columbus, IN (US)

(72) Inventors: Jennifer Kay Light-Holets, Greenwood, IN (US); Rohit Saha, Columbus, IN (US); Timothy Shipp, Seymour, IN (US); Daniel J. Mohr, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/461,188

(22) Filed: Aug. 30, 2021

(65) Prior Publication Data

US 2021/0388777 A1    Dec. 16, 2021

Related U.S. Application Data

(63) Continuation of application No. PCT/US2019/025779, filed on Apr. 4, 2019.

(51) Int. Cl.
| | |
|---|---|
| *F02D 13/06* | (2006.01) |
| *F02D 41/00* | (2006.01) |
| *F02D 41/24* | (2006.01) |
| *F02D 41/30* | (2006.01) |
| *F02B 37/24* | (2006.01) |

(52) U.S. Cl.
CPC .............. *F02D 13/06* (2013.01); *F02B 37/24* (2013.01); *F02D 41/008* (2013.01); *F02D 41/2429* (2013.01); *F02D 41/3064* (2013.01)

(58) Field of Classification Search
CPC .... F02D 13/06; F02D 41/008; F02D 41/2429; F02D 41/3064; F02D 41/0087; F02D 17/02; F02B 37/24; Y02T 10/12
See application file for complete search history.

(56) References Cited

U.S. PATENT DOCUMENTS

| | | | | |
|---|---|---|---|---|
| 4,305,355 | A * | 12/1981 | Jordan | F02D 17/02 123/90.11 |
| 6,415,601 | B1 * | 7/2002 | Glugla | F01N 3/2006 60/284 |
| 6,516,254 | B1 * | 2/2003 | Wakashiro | B60W 10/06 903/905 |
| 6,874,462 | B2 * | 4/2005 | Matthews | F02D 17/02 123/198 F |
| 7,621,252 | B2 | 11/2009 | Wong et al. | |
| 7,757,666 | B2 | 7/2010 | Whitney et al. | |
| 8,886,422 | B2 | 11/2014 | Sujan et al. | |
| 8,944,026 | B2 | 2/2015 | Tobergte et al. | |
| 9,835,097 | B1 * | 12/2017 | Schrewe | F02D 41/0002 |
| 10,018,133 | B2 * | 7/2018 | Leone | F02D 17/02 |

(Continued)

OTHER PUBLICATIONS

International Search Report and Written Opinion, PCT Appln. No. PCT/US19/25779, dated Jun. 21, 2019, 10 pgs.

*Primary Examiner* — David Hamaoui
(74) *Attorney, Agent, or Firm* — Taft, Stettinius & Hollister LLP (57) ABSTRACT

Systems, apparatus, and methods are disclosed that include an internal combustion engine having a plurality of cylinders operable by a valve actuation mechanism. A cylinder deactivation operation is modified in response to determining a cyclical operation mode of the engine.

14 Claims, 5 Drawing Sheets

(56) References Cited

U.S. PATENT DOCUMENTS

| | | | |
|---|---|---|---|
| 2002/0170527 A1* | 11/2002 | Rayl | F02D 17/02 123/198 F |
| 2004/0035113 A1* | 2/2004 | Hanada | F02D 41/0087 903/917 |
| 2007/0137199 A1* | 6/2007 | Magner | F02D 41/0007 60/605.1 |
| 2009/0194064 A1* | 8/2009 | Wong | F02D 17/02 701/112 |
| 2015/0322869 A1 | 11/2015 | Shost et al. | |
| 2016/0003168 A1 | 1/2016 | Leone et al. | |
| 2016/0252033 A1 | 9/2016 | Dye et al. | |
| 2017/0356371 A1 | 12/2017 | Rollinger et al. | |
| 2018/0057007 A1 | 3/2018 | Kromrey et al. | |
| 2018/0100459 A1 | 4/2018 | Dickson et al. | |
| 2018/0238249 A1* | 8/2018 | Soliman | F02D 41/0087 |
| 2018/0265074 A1* | 9/2018 | Lovelace | B60K 6/485 |
| 2018/0334970 A1* | 11/2018 | Kamo | F02D 41/3058 |

\* cited by examiner

CYCLICAL APPLICATIONS FOR INTERNAL COMBUSTION ENGINES WITH CYLINDER DEACTIVATION CONTROL

CROSS-REFERENCE TO RELATED APPLICATIONS

The present application is a continuation of International Patent App. No. PCT/US19/25779 filed on Apr. 4, 2019 which is incorporated herein by reference for all purposes in its entirety.

FIELD OF THE INVENTION

This invention relates to an internal combustion engine including multiple cylinders, and more particularly to controlling cylinder deactivation (CDA) during cyclical applications of the internal combustion engine.

BACKGROUND

The cylinders in an internal combustion engine can be disabled in order to reduce fuel consumption. This may be accomplished by cutting off the supply of fuel to selected cylinders, particularly to save fuel under light engine load conditions. This increases the load on the other cylinders and provides some pumping loss reduction, but still requires pumping work to move the air flow through all the cylinders. Another method of cylinder disablement includes disabling or maintaining the intake and exhaust valves of the cylinder in a closed condition while fuel is cut off, which further reduces pumping work over simply providing a fuel cut off to the deactivated cylinders.

Certain applications in which internal combustion engines are employed can be highly cyclical in operation. If cylinder deactivation events are employed in such operations, the cylinder deactivation may constantly turned on and off, which is undesirable. For example, constant exiting and/or entering a cylinder deactivation event in which the intake and exhaust valves are closed can create operating inefficiencies and lags in responsiveness of the engine. Therefore, further improvements in cylinder deactivation systems and techniques are needed.

SUMMARY

Embodiments include unique systems and methods that include a multi-cylinder internal combustion engine configured to control deactivation of at least one cylinder of the multiple cylinders. In one embodiment, the engine includes a valve actuation mechanism connected to the cylinder(s) and a fuel supply system for supplying fuel to each cylinder. A controller is configured to receive one or more inputs associated with one or more operating conditions of the vehicle to identify a cyclical operation mode for the engine and to modify a cylinder deactivation operation in response to the cyclical operation mode.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
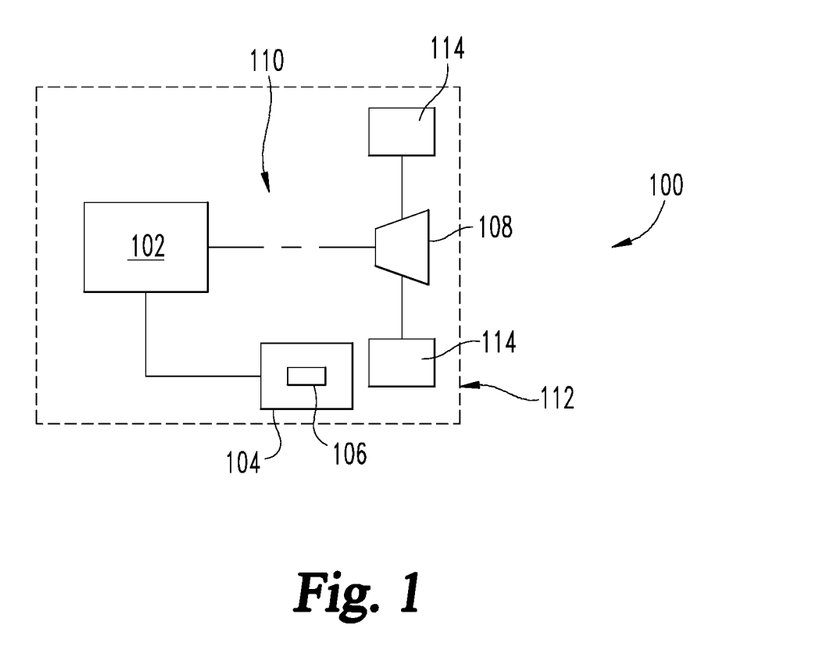
FIG. 1 is a schematic depiction of a vehicle system including a powertrain.

Referring to FIG. 1, a vehicle system 100 includes an engine 102 fluidly coupled to an aftertreatment system 104 as shown in FIG. 1. The vehicle system 100 may further include a transmission 108 coupled to the engine 102, comprising a portion of a powertrain 110 for propelling a vehicle 112. In one embodiment, vehicle 112 is propelled via wheels 114, but tracks, propellers, and other conveying devices for the vehicle 112 are also contemplated. In addition, engine 102 may be provided in stationary applications, such as a genset, with or without a vehicle.

The engine 102 may be any type of internal combustion engine, including at least a diesel, gasoline, or natural gas engine, and/or combinations thereof. The aftertreatment system 104 may include any type of aftertreatment components 106 known in the art, which may include catalytic and/or filtration components. Example aftertreatment components 106 may include, without limitation, oxidation catalysts (e.g., a diesel oxidation catalyst ("DOC"), $NO_x$ treatment components (e.g., three-way catalyst, lean NOx catalyst, selective catalytic reduction ("SCR") catalyst, etc.), a filtration component (either catalyzed or uncatalyzed, e.g., a diesel particulate filter ("DPF"), and a cleanup catalyst (e.g., an ammonia oxidation catalyst).

In certain embodiments, the engine 102 includes a lean combustion engine such as a lean burn gasoline engine, or a diesel cycle engine. In certain embodiments, the engine 102 may be any engine type employed in a cyclical application, such as those that result in a series of alternating first high load conditions and second low load conditions. In the illustrated embodiment of FIG. 2, the vehicle system 100 includes an engine 102 having an in-line 4 cylinder arrangement for illustration purposes. However, V-shaped arrangements and other any number of cylinders with V-shaped and with in-line arrangements are also contemplated.

The engine 102 includes a number of cylinders 103a, 103b (collectively referred to as cylinders 103.) The engine 102 includes nominal cylinders 103a which are operated with a nominal valve lift profile under both nominal operating events and cylinder deactivation events, and one or more deactivation cylinders 103b which are operated with a deactivated lift profile in response to a cylinder deactivation event being present. The deactivation cylinders 103b can be operated with the nominal valve lift profile when cylinder deactivation event conditions are not present. In the illustrated embodiment of FIG. 2, two cylinders of engine 102 are deactivation cylinders 103b, but more or fewer than two cylinders can be deactivation cylinders, including all cylinders 103. In addition, the cylinders identified as nominal cylinders 103a and deactivation cylinders 103b in FIG. 2 can be in any order. Furthermore, any known type of mechanism for deactivating one or more cylinders 103 is contemplated.

Figure 3:
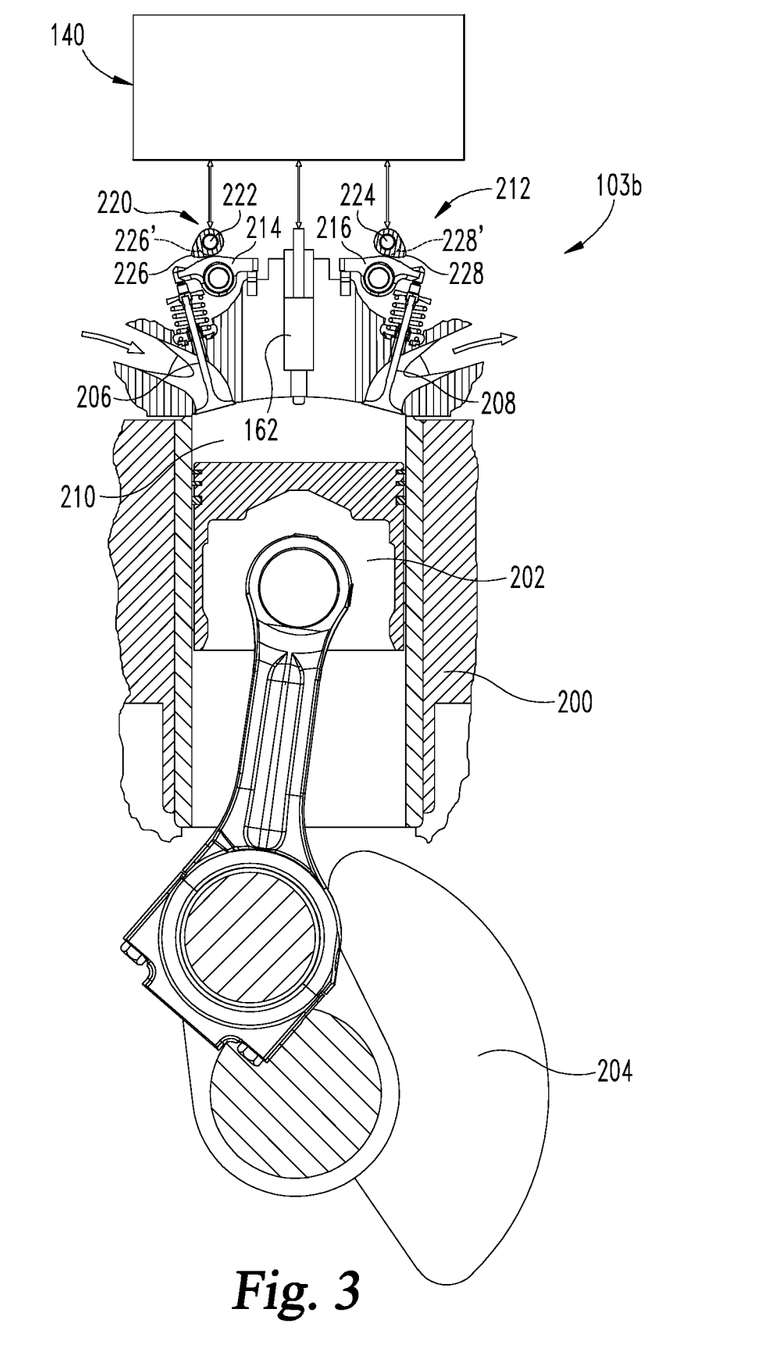
FIG. 3 is a schematic cross-section of a deactivation cylinder and valve actuation mechanism.

A typical multi-cylinder engine 102 has an engine block 200 with multiple cylinders 103, and, as shown in FIG. 3, a piston 202 in each cylinder that is operably attached to a crankshaft 204. There is also at least one intake valve 206 and at least one exhaust valve 208 that allow passage of air into and out of each cylinder 103. A combustion chamber 210 is formed inside each cylinder. The typical engine 102 operates on a four-stroke cycle that sequentially includes an air intake stroke, a compression stroke, a power stroke, and an exhaust stroke. As used herein, one cycle of the cylinder or engine occurs at the completion of these four strokes.

When cylinders 103b are deactivated, the valve opening devices of the valve actuation mechanism 220 can be collapsed so the intake and exhaust valves of the deactivated cylinder(s) 103b remain in a completely closed condition during a cylinder deactivation event. In addition, fuel delivery to the deactivated cylinder(s) 103b is stopped. The active cylinders 103a can then be operated with a greater amount of air and fuel to meet the engine power demands. The active cylinders 103a thus operate with a greater air flow, reducing pumping losses, and improved fuel efficiency. However, the transition between cylinder activated/deactivated operating conditions can result in inefficiencies and reduced responsiveness of engine 102, which increases as engine 102 is operated in a cyclical mode of operation. Therefore, the present disclosure includes modifying a cylinder deactivation mode of operation of engine 102 in response to a determination that the engine 102 is in a cyclical mode of operation, as discussed further below.

The present vehicle system 100 includes a valve actuation mechanism 220 that is configured and/or controlled to initiate and terminate a cylinder deactivation event for deactivation cylinders 103b. For example, in one embodiment, valve actuation mechanism 220 provides a first non-zero lift profile for opening and closing intake valve 206 of each cylinder 103 in response to nominal engine operating conditions. The exhaust valve(s) of each cylinder can also be opened and closed with a non-zero valve lift profile that is the same or different from that of the non-zero-valve lift profile that opens and closes the intake valves 206. Valve actuation mechanism 220 is further configured to be switched to a deactivated valve lift profile for operation of intake valves 206 and/or exhaust valves 208 of deactivation cylinders 103b in response to a cylinder deactivation event where cylinders 103b are deactivated.

In one embodiment, valve actuation mechanism 220 includes hardware mounted in a head 212 of engine 102 and control algorithms that are internal to the controller 140. The cylinder deactivation hardware includes a valve opening mechanism 214, 216 for respective ones of intake and exhaust valves 206, 208 of each cylinder 103. The valve actuation mechanism 220 also comprises a hydraulic subsystem (not shown) that supplies pressurized oil from an engine oil pump (not shown) to each valve opening mechanism 214, 216. In one embodiment, the valve opening mechanism 214, 216 is comprised of a lifter and a locking pin mechanism that is inserted between the camshaft 222, 224 and the respective valves 206, 208.

A typical valve train is comprised of the camshafts 222, 224, or in another embodiment a single cam shaft. The plurality of valves 206, 208 are normally closed to a zero lift position against their respective valve seats and are spring-mounted in the head 212. The valve train is operable to open the plurality of exhaust valves 208, the plurality of intake valves 206, or both, depending upon the engine design. Each camshaft 222, 224 is a long rod that is mounted in the engine 102 and rotates around its longitudinal axis. Each camshaft 222, 224 has cam lobes 226, 228, respectively, that correspond to and operate each valve 206, 208. Cam lobes 226, 228 are typically cut into the respective camshaft 222, 224 such that they are eccentric to the axis of rotation of the respective camshaft 222, 224.

Each lobe 226, 228 has an eccentric portion and a portion that is concentric to the longitudinal axis of the cam shaft. The concentric portion is defined by and can be referred to as the cam base circle, and the eccentric portion projects from the base circle to define a non-zero-lift profile to open and close the respective valve 206, 208 for a specified lift and duration from its valve seat. For example, the intake valve cam lobe 226 can define a non-zero lift profile 300 as shown in FIG. 3. Each lobe 226, 228 is in physical contact with a respective one of the valve opening mechanisms 214, 216, which are each comprised of a lifter and a locking pin mechanism. The valve opening mechanisms 214, 216 are in physical contact with a respective one of the valves 206, 208. The rotation of the camshaft 222, 224 causes respective valve 206, 208 to open according to the non-zero lift profile defined by the corresponding lobe 226, 228 when the position of the respective camshaft 222, 224 is such that the eccentric portion of its corresponding lobe 226, 228 is in contact with the adjacent valve opening mechanism 214, 216.

Figure 2:
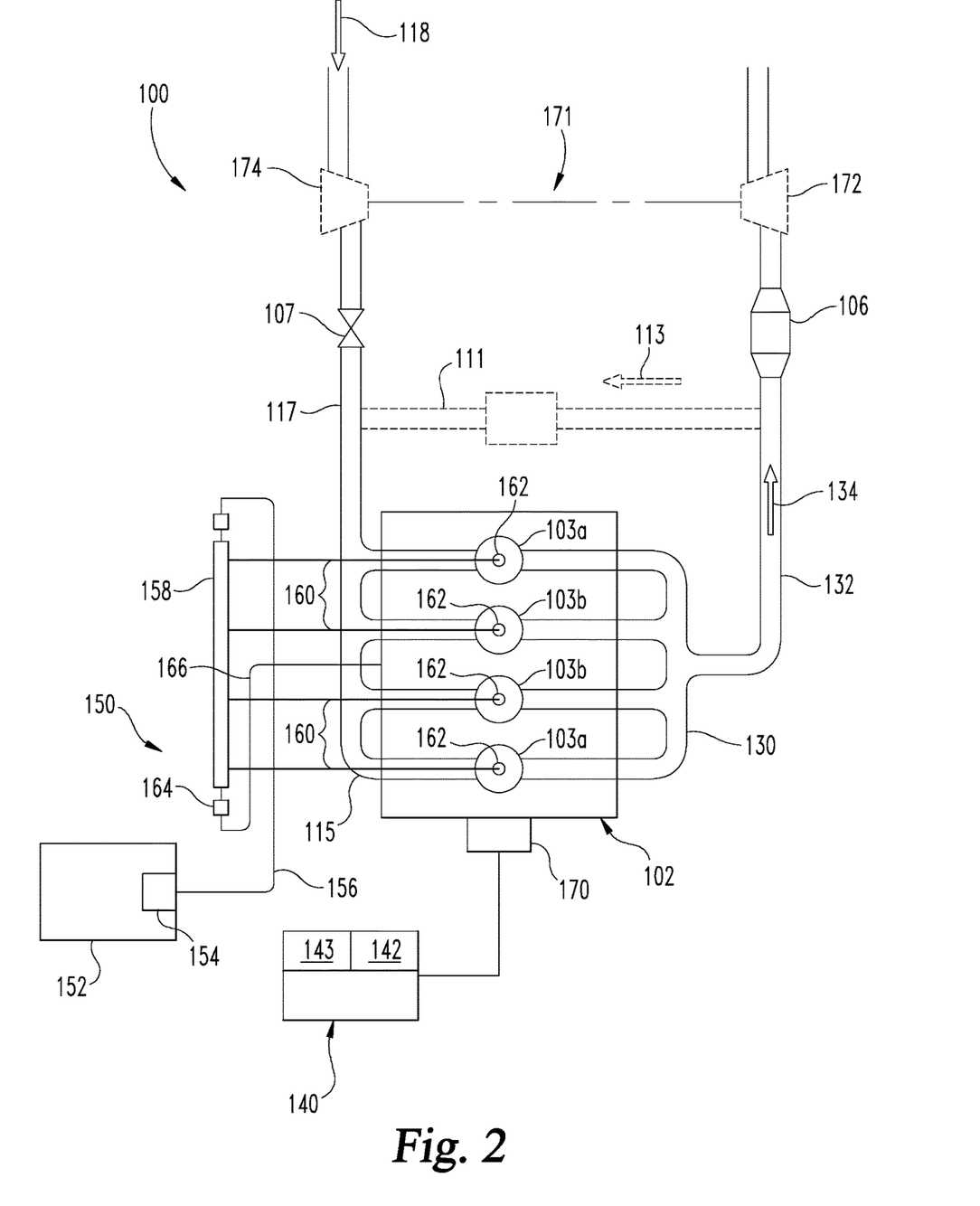
FIG. 2 is a schematic depiction one embodiment of a part the vehicle system of FIG. 1.

For deactivation cylinders 103b, such as shown in FIG. 2, the valve actuation mechanism 220 is operable to substantially or completely disable each intake valve 206, substantially or completely disable each exhaust valve 208, and substantially or completely disable each fuel injector 162 for each cylinder 103b that is to be deactivated in response to a cylinder deactivation condition. In one embodiment, the valve actuation mechanism 220 disables half of the cylinders 103 when in the deactivation mode. Other embodiments contemplate other fractions of the cylinders 103 being deactivated in the deactivation mode.

In a specific embodiment, camshaft 222 is switchable to place a second cam lobe 226' to operate the intake valves 206 of each of the deactivation cylinders 103b with a deactivated lift profile defined by second cam lobe 226' for intake valve 206 of the deactivation cylinder(s) 103b during cylinder deactivation conditions. Camshaft 224 associated with the exhaust valves 208 is also switchable from a third non-zero lift profile defined by a third cam lobe 228 to a fourth profile at a fourth cam lobe 228' that defines a deactivated lift profile that maintains the respective exhaust valve 208 at each deactivation cylinder 103b in a closed position. The deactivated lift profiles of cam lobes 226', 228' can be zero lift profiles so that the respective valve(s) remains in a closed position against its valve seat in response to cylinder deactivation events. Other embodiments contemplate lift profiles that are non-zero but effectively provide cylinder deactivation. In still other embodiments, any suitable valve actuation mechanism 220 for deactivating one or more cylinders 103 is contemplated, and it should be understood the present disclosure is not limited to the specifically disclosed embodiment unless noted otherwise.

Referring back to FIG. 2, in the vehicle system 100, exhaust flow 134 produced by cylinders 103 is provided to an exhaust manifold 130 and outlet to an exhaust passage 132. Vehicle system 100 may include an exhaust gas recirculation (EGR) passage 111 to provide an EGR flow 113 that combines with an intake flow 118 at a position upstream of an intake manifold 115. Intake manifold 115 provides a charge flow including the intake flow 118 and, if provided, with EGR flow 108 to cylinders 103. Intake manifold 115 is connected to an intake passage 117 that includes an intake throttle 107 to regulate the charge flow to cylinders 103. Intake passage 117 may also include a charge air cooler (not shown) to cool the charge flow provided to intake manifold 115. Intake passage 117 may also include an optional compressor 170 to compress the intake air flow received from an intake air cleaner (not shown.)

The EGR flow 113 may combine with the intake flow 118 at an outlet of EGR passage 111, at a mixer, or by any other arrangement. In certain embodiments, the EGR flow 113 returns to the intake manifold 115 directly. In the illustrated embodiment, EGR flow 113 mixes with the intake flow 118 downstream of throttle 107 so that exhaust pressure on cylinders 103 is closely aligned with intake pressure, which reduces pumping losses through cylinders 103. In other embodiments, EGR passage 111 can include an EGR cooler (not shown) and a bypass (not shown) with a valve that selectively allows EGR flow to bypass the EGR cooler. The presence of an EGR cooler and/or an EGR cooler bypass is optional and non-limiting.

Cylinders 103 are connected to an exhaust system that includes an exhaust manifold 130 that receives exhaust gases in the form of exhaust flow 134 from cylinders 103 and an exhaust passage 132 that receives exhaust gas from exhaust manifold 130. In other embodiments, a turbocharger 171 includes a turbine 172 in exhaust passage 132 is provided that is operable via the exhaust gases to drive a compressor 174 in intake passage 117. Turbine 172 may include a bypass (not shown) or a size-controllable inlet such as is provided with a variable geometry turbine (VGT) to control the exhaust flow therethrough and thus the speed of turbine 172. Exhaust passage 132 includes one or more aftertreatment components 106 in exhaust passage 132 configured to treat emissions in the exhaust gas. Other embodiments contemplate an exhaust throttle (not shown) in the exhaust passage 132.

Vehicle system 100 further includes a fuel system 150 that is operable to provide fuel from a fuel storage source 152, such as a fuel tank, to cylinders 103. In the illustrated embodiment, the fuel storage source 152 includes, for example, an onboard fuel pump 154 which delivers fuel from the source 152 via a conduit 156 through a filter (not shown) to a common supply rail 158. The common rail 158 feeds fuel via respective fuel lines 160 to a plurality of fuel injectors 162, at least one per cylinder, and in this example, four injectors 162. The common rail 158 can also be connected via conduit 156 to a pressure regulator valve 164 which in turn is connected to conduit 166 to vent fuel vapor to the intake passage 117 when the pressure in the rail 158 exceeds a predetermined maximum pressure. The fuel pump 154 is operated through a relay or other suitable connection to controller 140. It should be understood, however, that any suitable fuel system is contemplated.

A direct injector, as utilized herein, includes any fuel injection device that injects fuel directly into the cylinder volume, and is capable of delivering fuel into the cylinder volume when the intake valve(s) and exhaust valve(s) are closed. The direct injector 162 may be structured to inject fuel at the top of the cylinder 103. In certain embodiments, the direct injector 162 may be structured to inject fuel into a combustion pre-chamber. Each cylinder 103 may include one or more direct injectors 162. The direct injectors 162 may be the primary or the only fueling device for the cylinders 103, or alternatively the direct injectors may be an auxiliary or secondary fueling device for the cylinders 103. In certain embodiments, the direct injectors 162 are capable of providing the entire designed fueling amount for the cylinders 103 at any operating condition. Alternatively, the direct injectors 162 may be only partially capable, for example the direct injectors 162 may be capable of providing a designated amount of fuel for a specific purpose.

In still other embodiments, cylinders 103 include a port injector (not shown) in addition to or alternatively to direct injectors 162. In these embodiments, the intake manifold 115 may be divided, or the port fuel injectors may be positioned such that no other cylinder 103 in the vehicle system 100 is downstream of the port fuel injector, i.e. only the target cylinder is downstream of the respective port fuel injector. A port injector may also or alternatively be provided in the intake passage 117, such as at an inlet to compressor 174.

The fuel supply to the combustion chamber of each cylinder is controlled by a fuel control module 142 that is a separate controller or a part of controller 140. Fuel control module 142 operates the injectors 162 according to a fuel command produced by controller 140 in response to engine operating conditions. The controller 140 is connected to the fuel pump 154 and to a plurality of other sensors shown schematically as sensor 170. The sensors 170 may include, but are not limited to, sensors which monitor or measure vehicle speed, vehicle acceleration, engine position, engine speed, manifold static pressure, mass air flow into the manifold, engine temperature, air temperature, cam shaft position (inlet and exhaust), inlet manifold tuning valves, barometric pressure, EGR amount, VGT position, torque demand, gear position, etc. In addition, controller 140 may be configured to receive from, for example, one or more sensors 170 or from a memory 143 of controller 140, a proximity or position of other vehicles, a spacing or distance to one or more other vehicles, a speed of one or more other vehicles, route conditions, upcoming grade conditions, GPS data, mapping data, inputs from one or more other vehicles or a forward looking radar system, and/or one or more models of vehicle system 100 including estimated mass, aerodynamic drag, and other conditions associated with vehicle 112.

In certain embodiments, the vehicle system 100 includes a controller 140 structured to perform certain operations to control operations of engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown). The controller 140 is in communication with any sensor or actuator throughout the vehicle system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Certain systems are described following, and include examples of controller operations in various contexts of the present disclosure. In certain embodiments, the controller 140 interprets a cylinder deactivation event in response to one or more vehicle operating and/or route conditions, and in response to entering the cylinder deactivation event the controller 140 provides a cylinder deactivation command that cuts fueling to one or more of deactivation cylinders 103b and then switches operation of their respective intake valves 206 and exhaust valves 208 to second cam lobe 226' and fourth cam lobe 228', respectively, each having a cylinder deactivation lift profile as discussed above. In certain other embodiments, the controller 140 interprets a cylinder deactivation event in response to one or more vehicle operating and/or route conditions, and in response to exiting the cylinder deactivation event the controller 140 provides a cylinder activation command that first switches operation of their respective intake valves 206 and exhaust valves 208 to first cam lobe 226 and third cam lobe 228 to open and close the intake and exhaust valves, and then provides fueling to the re-activated cylinders.

The determination that conditions for entering and exiting a cylinder deactivation event includes determining or interpreting one or more vehicle operating conditions understood in the art indicating that cylinder deactivation produces favorable operating conditions, such as at low engine load conditions where the remaining non-deactivated cylinders 103a can satisfy the engine load requirements and fuel efficiency can be achieved by cutting fueling to one or more of the deactivation cylinders 103b. However, other conditions in which the cylinder deactivation event is present are also contemplated.

The operation of the engine 102 is controlled by the controller 140 in response to vehicle operating conditions sensed by the sensors represented by sensor(s) 170. Controller 140 is connected to the fuel injectors 162, either indirectly as shown through fuel control module 142, or directly, to control the injector operation. The controller 140 can determine the injection timing and the injection period or pulse width. Under normal or nominal engine operating conditions, fuel is provided to all cylinders 103. Under a cylinder deactivation event, fuel is only provided to cylinders 103a and cut off from deactivation cylinders 103b.

The fuel injectors 162 may inject the fuel supply directly into each respective cylinder 103 or may supply fuel to the inlet valve ports, the injection timing being controlled by the controller 140. During a cylinder deactivation event the supply of fuel to the deactivation cylinders 103b is cut off by individually disabling the respective fuel injectors 162 with the disablement being controlled by the controller 140 with a fueling command which disables the fuel injection to one or more of the deactivation cylinders 103b while the nominal cylinders 103a fire normally, or are compensated with additional fuel and air flow to meet power demands.

Figure 4:
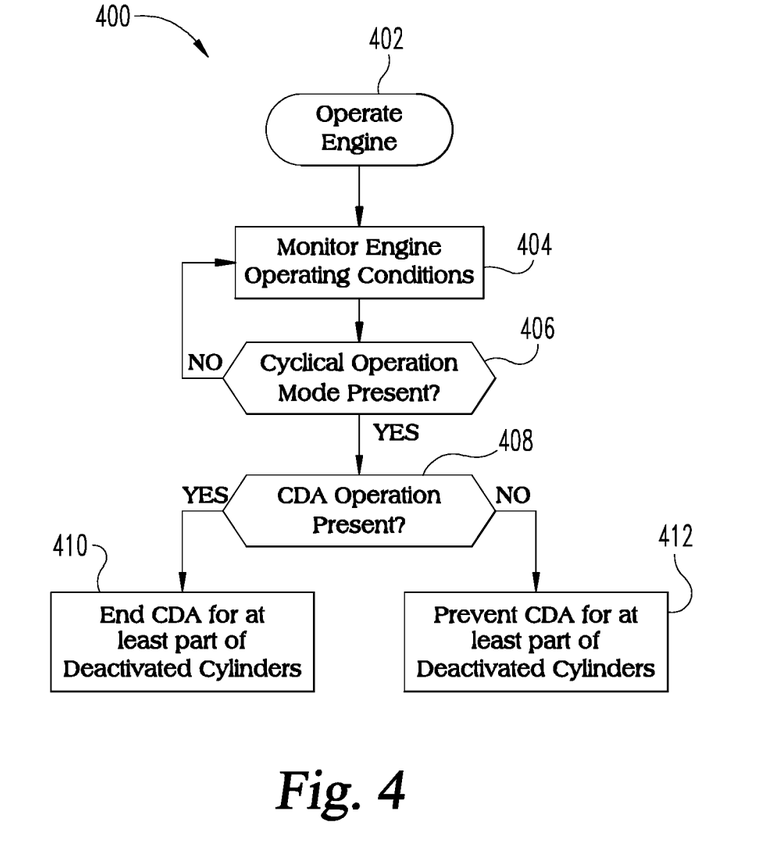
FIG. 4 is a flow diagram of a procedure for controlling one or more deactivated cylinders of an internal combustion engine.

Referring to FIG. 4, there is shown a flow diagram of a procedure 400 for modifying a cylinder deactivation (CDA) operation of one or more of the cylinders 103 of engine 102 in response to a cyclical mode of operation of engine 102. Procedure 400 begins at operation 402 in which the engine 102 is operated. Procedure 400 continues at operation 404 to monitor engine and/or vehicle operating conditions to identify whether or not a cyclical engine operating mode is present. The engine operating conditions to be monitored include, for example, a load of engine 102, speed of engine 102 or vehicle 112, a calibratable parameter of engine 102 or vehicle 112 such as a temperature or pressure condition, a switch or datalink message indicating that the vehicle 112 or engine 102 is operating in a cyclical mode (operator input or engagement of an implement, for example), torque spikes of a unit period of time is greater than a threshold, CDA has been turned on and off more than a threshold amount over a unit period of time, and/or a variable geometry turbine (VGT) is overclosed. In one embodiment, a cyclical mode of operation can be determined such as disclosed in U.S. Pat. No. 10,018,133, which is incorporated herein by reference.

At conditional 406 it is determined if a cyclical mode of operation of present. If conditional 406 is NO, procedure 400 returns to operation 404 to continue monitoring. If conditional 408 is YES, procedure 400 continues at conditional 408 to determine if a CDA operation is present in one of more cylinders. If conditional 408 is YES, procedure 400 continues at operation 410 to end CDA operation for all or at least part of the cylinders 103b that are currently deactivated. If conditional 408 is NO, procedure 400 continues at operation 412 to prevent CDA operation for all or at least part of the cylinders 103. In another embodiment, a sustained low load condition is determined in response to the engine 102 operating at or below a threshold load level for a threshold amount of time. For example, if an engine is operating at idle for a percentage of time more than a threshold amount, then CDA operation can be reactivated for all or a part of the cylinders 103.

Controller 140 can be configured with one or more circuits configured to perform the procedure 400. For example, in FIG. 5 a schematic of controller 140 includes a controller apparatus 500 with a cyclical mode operation determination circuit 502 that determines the presence or absence of a cyclical mode of operation in response to one or more operating condition inputs 506. In response to circuit 502 determining a cyclical mode of operation being present, controller apparatus includes a CDA modification circuit 504 that outputs a CDA modification command 508.

Figure 5:
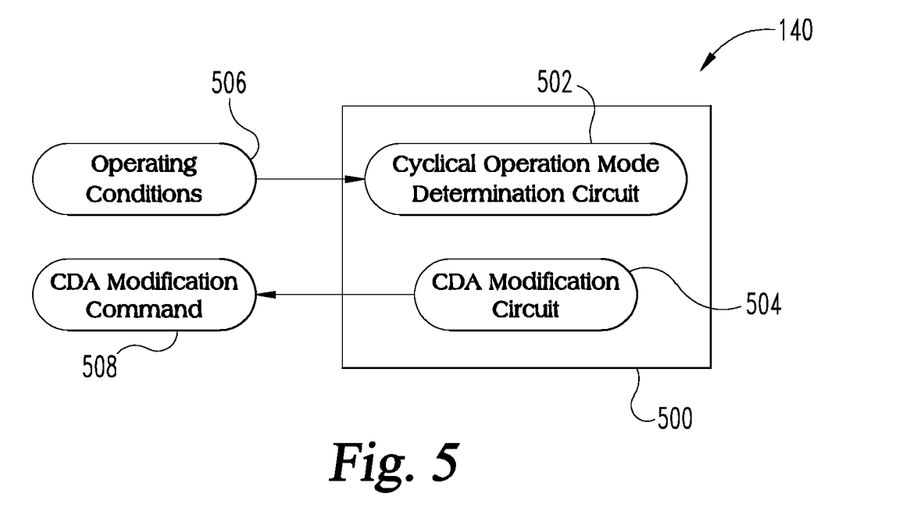
FIG. 5 is a schematic of a controller apparatus of the vehicle system of FIG. 1.

The CDA modification command 508 can include modifying the cylinder deactivation operation by one or more of disabling the cylinder deactivation operation by discontinuing deactivation or reactivating all currently deactivated ones the plurality of cylinders 103b, discontinuing the cylinder deactivation operation or reactivating a part of currently deactivated ones of the plurality of cylinders 103b, and/or preventing the cylinder deactivation operation for all or a part of the plurality of cylinders 103b. In another embodiment, controller 140 can be configured to determine a sustained low load condition in response to the engine 102 operating at or below a threshold load level for a threshold amount of time. CDA operation that has been disabled can be reactivated in response to detection of sustained low load conditions for engine 102.

The one or more operating condition inputs 506 from which the controller apparatus 500 is configured to determine the cyclical mode of operation include one or more of: a load profile of the engine 102 having a series of alternating first and second load conditions in which the first load condition is greater than the second load condition; a calibratable operating parameter of engine 102 or vehicle 112 obtaining a target value; a number of torque spikes for engine 102 that occur in a time period and are greater than a threshold torque amount; the CDA operation of one or more of cylinders 103b being turned on and off more than a threshold number of times in a certain or predetermined time period; an inlet of a variable geometry turbine 172 being over-closed; and/or an input indicating the engine 102 will be operated in the cyclical mode of operation, such as an operator input switch or implement being activated.

Various aspects of the present disclosure are contemplated. According to one aspect, a system includes an internal combustion engine including a plurality of cylinders where each of the cylinders includes at least one intake valve and at least one exhaust valve. The system also includes a valve actuation mechanism connected to each of the plurality of cylinders that includes a lifting mechanism for opening and closing the at least one intake valve and the at least one exhaust valve, and a fueling system connected to each of the plurality of cylinders for providing fuel to the plurality of cylinders. The system also includes a controller operably connected with the valve actuation mechanism and the fueling system. The controller is configured to determine a cyclical mode of operation of the internal combustion engine in response to one or more operating conditions of the internal combustion engine and, in response to the cyclical mode of operation being determined, modify a cylinder deactivation operation of the internal combustion engine.

In one embodiment, the controller is configured to modify the cylinder deactivation operation by decreasing a number of deactivated cylinders and disabling the cylinder deactivation operation for the active cylinders. In another embodiment, the controller is configured to modify the cylinder deactivation operation by increasing a number of active cylinders and disabling the cylinder deactivation operation of the active cylinders. In yet another embodiment, the controller is configured to modify the cylinder deactivation operation by preventing the cylinder deactivation operation.

In another embodiment, the one or more operating conditions from which the controller is configured to determine the cyclical mode of operation include a load profile of the internal combustion engine having a series of alternating first and second load conditions in which the first load condition is greater than the second load condition. In yet another embodiment, the one or more operating conditions from which the controller is configured to determine the cyclical mode of operation include a calibratable operating parameter of the vehicle obtaining a target or threshold value.

In another embodiment, the one or more operating conditions from which the controller is configured to determine the cyclical mode of operation include a number of torque spikes for the internal combustion engine that occur in a time period and are greater than a threshold torque amount. In yet another embodiment, the one or more operating conditions from which the controller is configured to determine the cyclical mode of operation include the cylinder deactivation operation being turned on and off more than a threshold number of times in a time period.

In another embodiment, the one or more operating conditions from which the controller is configured to determine the cyclical mode of operation include an inlet of a variable geometry turbine being over-closed. In yet another embodiment, the one or more operating conditions from which the controller is configured to determine the cyclical mode of operation include an input indicating the internal combustion engine will be operated in the cyclical mode of operation. In a refinement of this embodiment, the input is received from one or more of a switch, an operator input, a datalink message, and a vehicle controller.

In another embodiment, the controller is configured to modify the cylinder deactivation operation of the internal combustion engine in response to a sustained load condition of the internal combustion engine being less than a threshold amount for a threshold amount of time.

According to another aspect, a method includes determining a cyclical mode of operation of an internal combustion engine is present in response to one or more operating conditions of the vehicle and modifying a cylinder deactivation operation of the engine in response to the cyclical mode of operation being present.

In one embodiment, the cylinder deactivation operation includes at least one cylinder from a plurality of cylinders of the internal combustion engine in which a valve actuation mechanism operably connected to the at least one cylinder is deactivated and fueling to the at least one cylinder is cut off. In a refinement of this embodiment, the cylinder deactivation operation includes remaining ones of the plurality of cylinders receiving fueling and the valve actuation mechanism opening and closing the at least one intake and exhaust valves of the remaining ones of the plurality of cylinders.

In another embodiment, the cylinder deactivation operation is modified by decreasing a number of deactivated cylinders and disabling the cylinder deactivation operation for the active cylinders. In yet another embodiment, the cylinder deactivation operation is modified by increasing a number of active cylinders and disabling the cylinder deactivation operation of the activate cylinders.

In another embodiment, the cylinder deactivation operation is modified by preventing the cylinder deactivation operation for the plurality of cylinders. In yet another embodiment, the cyclical mode of operation is determined in response to a load profile of the internal combustion engine having a series of alternating first and second load conditions in which the first load condition is greater than the second load condition.

In another embodiment, the cyclical mode of operation is determined in response to a calibratable operating parameter. In yet another embodiment, the cyclical mode of operation is determined in response to a number of torque spikes for the internal combustion engine that occur in a time period and are greater than a threshold torque amount.

In another embodiment, the cyclical mode of operation is determined in response to the cylinder deactivation operation being turned on and off more than a threshold number of times in a time period. In yet another embodiment, the cyclical mode of operation is determined in response to an inlet of a variable geometry turbine connected to the internal combustion engine being over-closed.

In another embodiment, the cyclical mode of operation is determined in response to a datalink message or switch input indicating the internal combustion engine will be operated in the cyclical mode of operation. In yet another embodiment, the method includes modifying the cylinder deactivation operation of the engine in response to a sustained load condition of the internal combustion engine being less than a threshold amount for a threshold amount of time.

According to another aspect, an apparatus is provided that includes an electronic controller operable to receive inputs associated with operation of an internal combustion engine including a plurality of cylinders. The controller is configured to determine a cyclical mode of operation for the internal combustion engine in response to the inputs, and modify a cylinder deactivation operation of the plurality of cylinders in response to the cyclical mode of operation.

In one embodiment, the controller is configured to modify the cylinder deactivation operation by one or more of discontinuing the cylinder deactivation operation of the plurality of cylinders, discontinuing the cylinder deactivation operation for a part of the plurality of cylinders, and preventing the cylinder deactivation operation for at least a part of the plurality of cylinders.

In yet another embodiment, the one or more operating conditions from which the controller is configured to determine the cyclical mode of operation include one or more of: a load profile of the internal combustion engine having a series of alternating first and second load conditions in which the first load condition is greater than the second load condition; a calibratable operating parameter of the internal combustion engine obtaining a target value; a number of torque spikes for the internal combustion engine that occur in a time period and are greater than a threshold torque; the cylinder deactivation operation being turned on and off more than a threshold number of times in a time period; an inlet of a variable geometry turbine being over-closed; and a datalink message or switch input indicating the internal combustion engine will be operated in the cyclical mode of operation.

In another embodiment, the controller is configured to modify the cylinder deactivation operation of the internal combustion engine in response to a sustained load condition of the internal combustion engine being less than a threshold amount for a threshold amount of time.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an internal combustion engine including a plurality of cylinders, each of the cylinders including at least one intake valve and at least one exhaust valve;
    a valve actuation mechanism connected to each of the plurality of cylinders, the valve actuation mechanism including a lifting mechanism for opening and closing the at least one intake valve and the at least one exhaust valve;
    a fueling system connected to each of the plurality of cylinders for providing fuel to the plurality of cylinders;
    a controller operably connected with the valve actuation mechanism and the fueling system, wherein the controller is configured to:
        determine a cyclical mode of operation of the internal combustion engine in response to variation of one or more operating conditions of the internal combustion engine over a unit period of time;
        determine that a cylinder deactivation operation is present in the plurality of cylinders; and
        in response to the cyclical mode of operation being determined and the cylinder deactivation operation being present, modify the cylinder deactivation operation of the internal combustion engine by removing a part of the cylinders that are participating in the cylinder deactivation operation from continued operation as deactivated cylinders; and
        reactivate cylinder deactivation operation for the part of the cylinders that were removed from continued participation in the cylinder deactivation operation in response to the internal combustion engine operating at a sustained load condition that is less than a threshold amount for more than a threshold amount of time.

2. The system of claim 1, wherein the controller is configured to disable the cylinder deactivation operation for the active cylinders.

3. The system of claim 1, wherein the controller is configured to modify the cylinder deactivation operation by preventing the cylinder deactivation operation.

4. The system of claim 1, wherein the one or more operating conditions from which the controller is configured to determine the cyclical mode of operation include a load profile of the internal combustion engine having a series of alternating first and second load conditions in which the first load condition is greater than the second load condition.

5. The system of claim 1, wherein the one or more operating conditions from which the controller is configured to determine the cyclical mode of operation include a calibratable operating parameter of the vehicle obtaining a target or threshold value.

6. The system of claim 1, wherein the one or more operating conditions from which the controller is configured to determine the cyclical mode of operation include a number of torque spikes for the internal combustion engine that occur in a time period and are greater than a threshold torque amount.

7. The system of claim 1, wherein the one or more operating conditions from which the controller is configured to determine the cyclical mode of operation include the cylinder deactivation operation being turned on and off more than a threshold number of times in a time period.

8. The system of claim 1, wherein the one or more operating conditions from which the controller is configured to determine the cyclical mode of operation include an inlet of a variable geometry turbine being over-closed.

9. A method, comprising:
determining a cyclical mode of operation of an internal combustion engine is present in response to variation of one or more operating conditions of the vehicle over a unit period of time;
determining that a cylinder deactivation operation is present in a plurality of cylinders of the internal combustion engine; and
modifying the cylinder deactivation operation of the engine in response to the cyclical mode of operation and the cylinder deactivation operation being present, wherein modifying the cylinder deactivation operation includes removing a part of the cylinders that are participating in the cylinder deactivation operation from continued operation as deactivated cylinders; and
reactivating cylinder deactivation operation for the part of the cylinders that were removed from continued participation in the cylinder deactivation operation in response to the internal combustion engine operating at a sustained load condition that is less than a threshold amount for more than a threshold amount of time.

10. The method of claim 9, wherein the cylinder deactivation operation includes deactivating a valve actuation mechanism operably connected to the deactivated cylinders and cutting off fueling to the deactivated cylinders, and remaining ones of the plurality of cylinders receive fueling and the valve actuation mechanism opens and closes the at least one intake and exhaust valves of the remaining ones of the plurality of cylinders.

11. The method of claim 9, wherein the cyclical mode of operation is determined in response to a load profile of the internal combustion engine having a series of alternating first and second load conditions in which the first load condition is greater than the second load condition.

12. The method of claim 9, wherein the cyclical mode of operation is determined in response to one or more of:
a calibratable operating parameter;
a number of torque spikes for the internal combustion engine that occur in a time period and are greater than a threshold torque amount;
the cylinder deactivation operation being turned on and off more than a threshold number of times in a time period; and
an inlet of a variable geometry turbine connected to the internal combustion engine being over-closed.

13. An apparatus, comprising:
an electronic controller operable to receive inputs associated with operation of an internal combustion engine including a plurality of cylinders, wherein the controller is configured to determine a cyclical mode of operation for the internal combustion engine in response to variation of the inputs over a unit period of time, determine that a cylinder deactivation operation is present in the plurality of cylinders, and modify a cylinder deactivation operation of the plurality of cylinders in response to the cyclical mode of operation and the cylinder deactivation operation both being present by removing a part of the cylinders that are participating in the cylinder deactivation operation from continued operation as deactivated cylinders, wherein the controller is configured to reactivate cylinder deactivation operation for the part of the cylinders that were removed from continued participation in the cylinder deactivation operation in response to the internal combustion engine operating at a sustained load condition that is less than a threshold amount for more than a threshold amount of time.

14. The apparatus of claim 13, wherein the one or more operating conditions from which the controller is configured to determine the cyclical mode of operation include one or more of:
a load profile of the internal combustion engine having a series of alternating first and second load conditions in which the first load condition is greater than the second load condition;
a calibratable operating parameter of the internal combustion engine obtaining a target value;
a number of torque spikes for the internal combustion engine that occur in a time period and are greater than a threshold torque;
the cylinder deactivation operation being turned on and off more than a threshold number of times in a time period; and
an inlet of a variable geometry turbine being over-closed.

\* \* \* \* \*